(12) United States Patent
Singh et al.

(10) Patent No.: US 8,626,902 B2
(45) Date of Patent: Jan. 7, 2014

(54) MODELING AND REDUCING POWER CONSUMPTION IN LARGE IT SYSTEMS

(75) Inventors: Nidhi Singh, Bangalore (IN); Shrisha Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 12/959,481

(22) Filed: Dec. 3, 2010

(65) Prior Publication Data

US 2012/0144017 A1    Jun. 7, 2012

(51) Int. Cl.
   *G06F 15/173* (2006.01)
(52) U.S. Cl.
   USPC ............................. 709/224; 709/226; 713/300
(58) Field of Classification Search
   USPC ........................................... 709/224; 713/300
   See application file for complete search history.

(56) References Cited

U.S. PATENT DOCUMENTS

| | | | |
|---|---|---|---|
| 7,415,453 B2 | 8/2008 | Suzuki et al. | |
| 7,707,443 B2 | 4/2010 | Chheda et al. | |
| 8,225,119 B2 * | 7/2012 | Jain et al. | 713/320 |
| 8,286,165 B2 * | 10/2012 | Miyata et al. | 718/1 |
| 2008/0281564 A1 * | 11/2008 | Suzuki et al. | 703/2 |
| 2008/0295096 A1 | 11/2008 | Beaty et al. | |
| 2009/0240964 A1 | 9/2009 | Pfeiffer | |
| 2010/0100877 A1 | 4/2010 | Greene et al. | |
| 2010/0115509 A1 | 5/2010 | Kern et al. | |

OTHER PUBLICATIONS

P. K. Enumula and S. Rao, "The Potluck Problem," Version 1, Sep. 12, 2008, International Institute of Information Technology, Bangalore India; (available online at: http://arxiv.org/abs/0809.2136v1).
P. K. Enumula and S. Rao, "The Potluck Problem," Dec. 16, 2009; Version 2; DOI: 10.1016/j.econlet.2009.12.011; Journal of Economics Letters; (available online at http://arxiv.org/abs/0809.2136v2).
Nidhi Singh and, Shrisha Rao, "Modeling And Reducing Power Consumption In Large IT Systems," IEEE Systems Conference, Apr. 5, 2010, San Diego, CA.
N. Singh and S. Rao, "The potluck problem with consumers' choice behavior," in 6th Annual IEEE Conference on Automation Science and Engineering, Bangalore, India, Aug. 21, 2009.
Nidhi Singh and, Shrisha Rao, "Energy Optimization Policies for Servers," 7th Annual IEEE Conference on Automation Science and Engineering, Toronto, Canada, Aug. 21, 2010.

(Continued)

*Primary Examiner* — Patrice Winder
*Assistant Examiner* — Eyob Hagos
(74) *Attorney, Agent, or Firm* — Brevetto Law Group

(57) ABSTRACT

The power consumed by a large IT system may be managed by individual servers calculating a set of predictors of the resources of the large IT system that may be required for a future time period, and weighting factors for those predictors. The predictors and weighting factors may be based on historical data showing actual resources used and past values of the predictors and weighting factors. An estimate of the resources required for the large IT system is then produced based on the predictors and weighting factors and the estimate is then used to determine excess resources of the individual server that may be put into a low power state in the future time period to minimize the power used. If too much resource is excess, the server may enter a soft off state.

22 Claims, 3 Drawing Sheets

(56) References Cited

OTHER PUBLICATIONS

K. Rajamani and C. Lefurgy, "On evaluating request-distribution schemes for saving energy in server clusters," in Proceedings of the IEEE International Symposium on Performance Analysis of Systems and Software, 2003; (available online at http://citeseerx.ist.psu.edu/viewdoc/download?doi=10.1.1.12.8666&rep=rep1&type=pdf).

J. S. Chase, D. C. Anderson, P. N. Thakar, and A. M. Vahdat, "Managing energy and server resources in hosting centers," in 18th Symposium on Operating Systems Principles, 2001; (available online at http://bnrg.eecs.berkeley.edu/~randy/Courses/CS294.F07/21.1.pdf).

R. P. Doyle, J. S. Chase, O. M. Asad, W. Jin, and A. M. Vahdat, "Model based resource provisioning in a web service utility," in Proceedings of the 4th conference on USENIX Symposium on Internet Technologies and Systems, 2003; (available online at http://www.csd.uwo.ca/courses/CS9843b/papers/model_paper.pdf)

X. Fan, W.-D. Weber, and L. A. Barroso, "Power provisioning for a warehouse-sized computer," in Proceedings of the ACM International Symposium on Computer Architecture, 2007; (available online at http://bnrg.eecs.berkeley.edu/~randy/Courses/CS294.F07/20.3.pdf).

D. Villela, P. Pradhan, and D. Rubenstein, "Provisioning servers in the application tier for e-commerce systems," in 12th IEEE International Workshop on Quality of Service, 2004; (available online at http://dna-pubs.cs.columbia.edu/citation/paperfile/49/Villela2004_Provisioning.pdf).

D. Gmach, J. Rolia, L. Cherkasova, and A. Kemper, "Workload analysis and demand prediction of enterprise data center applications," in 10th IEEE International Symposium on Workload Characterization, 2007; (available online at http://www.hpl.hp.com/personal/Lucy_Cherkasova/papers/iiswc2007-cr.pdf).

D. Gmach, J. Rolia, L. Cherkasova, and A. Kemper"Capacity management and demand prediction for next generation data centers," in Proceedings of the IEEE International Conference on Web Services (ICWS), 2007; (available online at http://www.hpl.hp.com/personal/Lucy_Cherkasova/papers/capacity-icws.pdf).

T. Vercauteren, P. Aggarwal, X.Wang, and T. Hsin Li, "Hierarchical forecasting of web server workload using sequential monte carlo training," IEEE Transactions on Signal Processing, vol. 55, pp. 1286-1297, 2007; (available online at http://citeseerx.ist.psu.edu/viewdoc/download?doi=10.1.1.61.208&rep=rep1&type=pdf).

W. B. Arthur, "Inductive reasoning and bounded rationality," American Economic Review, vol. 84, No. 2, pp. 406-411, 1994; (available online at http://tuvalu.santafe.edu/~wbarthur/Papers/El_Farol.html).

N. Littlestone and M. K. Warmuth, "The weighted majority algorithm," Information and Computation, vol. 108, No. 2, pp. 212-261, Feb. 1994; (available online at http://www.cs.iastate.edu/~honavar/winnow1.pdf retrieved on Jul. 20, 2010).

"Taming the Power Hungry Data Center," FusionIO, 2007; (available online at http://www.fusionio.com/images/white-papers/Whitepaper_Green.pdf).

M Blackburn, "Five Ways to Reduce Data Center Server Power Consumption," The Green Grid, 2008; (available online at http://www.globalfoundationservices.com/environment/documents/White_Paper_7_-_Five_Ways_to_Save_Power.pdf).

A. Verma, et al., "Server Workload Analysis for Power Minimization using Consolidation," 2009 USENIX Annual Technical Conference, Jun. 14, 2009, San Diego, CA; (available online at http://www.usenix.org/event/usenix09/tech/full_papers/verma/verma.pdf).

B. Lubin, et al., "Expressive Power-Based Resource Allocation for Data Centers," Twenty-First International Joint Conference on Artificial Intelligence (IJCAI'09), Jul. 14, 2009, Pasadena, CA, p. 1451-1456; (available online at http://www.eecs.harvard.edu/econcs/pubs/lubin09.pdf).

J. Kaplan, et al., "Revolutionizing Data Center Energy Efficiency," McKinsey & Company, Jul. 2008; (available online at http://www.mckinsey.com/clientservice/bto/pointofview/pdf/Revolutionizing_Data_Center_Efficiency.pdf).

D. Economou, et al. "Full-System Power Analysis and Modeling for Server Environments," Workshop on Modeling, Benchmarking and Simulation, Jun. 18, 2006, Boston, MA; (available online at http://www.hpl.hp.com/personal/Partha_Ranganathan/papers/2006/2006_mobs_mantis.pdf).

T. Heath, B. Diniz, E. Carrera, W. Meira, and R. Bianchini, "Energy conservation in heterogeneous server clusters," in ACM SIGPLAN 2005 Symposium on Principles and Practice of Parallel Programming, 2005; (available online at http://citeseerx.ist.psu.edu/viewdoc/download?doi=10.1.1.131.6221&rep=rep1&type=pdf).

J. Moore, J. Chase, K. Farkas, and P. Ranganathan, "Data center workload monitoring, analysis, and emulation," in 8th Workshop on Computer Architecture Evaluation using Commercial Workloads, 2005; (available online at http://bnrg.eecs.berkeley.edu/~randy/Courses/CS294.F07/23.1.pdf).

H. Hlavacs, et al., "Energy Saving in Future Home Environments," Nov. 24, 2008, IFIP Wireless Days 2008, Dubai, UAE.

"Report to congress on server and data center energy efficiency." Public Law 109-431,U.S. Environmental Protection Agency ENERGY STAR Program, 2007; (available online at http://www.energystar.gov/ia/partners/prod_development/downloads/EPA_Datacenter_Report_Congress_Final1.pdf).

\* cited by examiner

MODELING AND REDUCING POWER CONSUMPTION IN LARGE IT SYSTEMS

BACKGROUND

1. Field of the Invention

The present subject matter relates to reducing power consumption in large information technology (IT) systems, and more specifically, to modeling demand for resources on the large IT systems for time period and then providing only the resources needed during that time period.

2. Description of Related Art

Large IT systems, such as data centers and server farms, consumed about 61 billion kilowatt-hours (kWh) in 2006 in the U.S. (1.5% of total U.S. electricity consumption) for a total electricity cost of about $4.5 billion. It is also estimated that the energy consumption by data centers and servers in the U.S. in 2006 is more than double the electricity that was consumed for this purpose in 2000. Taking these facts into consideration, it can be safely deduced that there is a growing need to contain the energy consumed by large and complex IT systems. Not only would this result in greener, energy-efficient IT systems but would also help in improving the financial performance of the organizations owning these systems

SUMMARY

Various embodiments involve a method for managing power of a server which is a part of a group of servers. The method may calculate a first set of predictors of utilization of a first resource of the group of servers for a time period and update a first set of weighting factors for the first set of predictors. The first set of weighting factors may be based on past accuracy of the first set of predictors. An estimation of a total amount of the first resource of the group of servers that will be required may be produced for the time period based on the first plurality of predictors and the first plurality of weighting factors. An excess amount of the first resource available from the first server during the time period may be determined, based on the estimation of the total amount of the first resource of the group of servers and the excess amount of the first resource of the server may be configured to enter a low power state for the time period.

Other embodiments involve a computer program product for managing power of a server of a group of servers. The computer program product may include a non-transitory computer readable storage medium having computer readable program code stored on it, the computer readable program code configured to implement the method described above.

Other embodiments involve a computer server including a CPU, a network adapter and a non-transitory computer readable storage medium having computer readable program code stored on it, the computer readable program code configured to implement the method described above.

BRIEF DESCRIPTION OF THE SEVERAL VIEWS OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

In the following detailed description, numerous specific details are set forth by way of examples in order to provide a thorough understanding of various embodiments. However, it should be apparent to those skilled in the art that the embodiments of the present disclosure may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases used in this disclosure are presented in the following paragraphs for clarity.

A large information technology (IT) system is a group of IT resources that may allow at least some aspects of their operation, capabilities and/or resources, to be managed as a system. The IT resources may include, but are not limited to, servers, computer workstations, storage subsystems, routers, switches, and other IT equipment. Aspects that may be managed for various large IT systems may include, but not limited to, virtualization services, application services, application loading, power state, redundancy, and other aspects of IT systems.

A server is a computer that connects to a network and provides some level of computation, memory, non-volatile storage, bandwidth to non-volatile storage, communication bandwidth, transaction processing, or other computer services to clients over the network. Some servers may provide a balanced set of resources while other may essentially provide one type of capability with very little of the other resources. For example, a server may utilize a storage area network to provide a large amount of non-volatile storage and only provide enough computational capability to handle the storage area network while other servers may provide significant computational capability with multiple CPUs, each with multiple cores and only minimal non-volatile storage for caching temporary data.

Reference now is made in detail to the examples illustrated in the accompanying drawings and discussed below.

Figure 1:
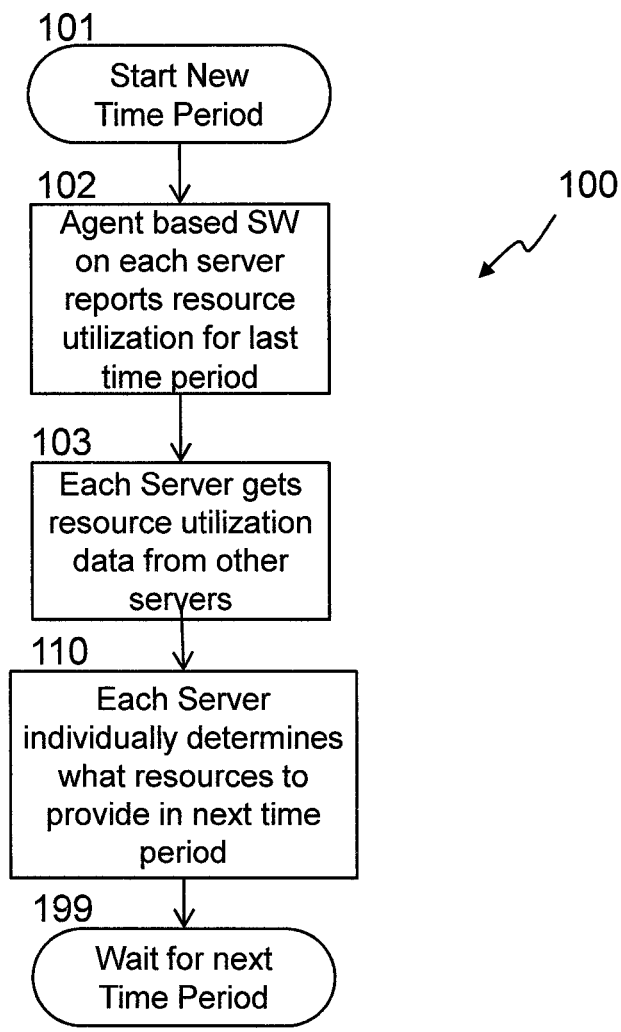
FIG. 1 is a flowchart depicting an embodiment of a method of predicting the resources needed for a group of servers and then providing those resources.

FIG. 1 is a flowchart 100 depicting an embodiment of a method of predicting the resources needed for a group of servers and then providing those resources. The method shown in the flowchart 100 may be performed, starting at block 101, at a regular interval, t, or it may be performed only when needed, initiated by a human operator, an error condition, in indication that service times for the applications being served has risen too high, an indication that a particular resource is underutilized, or any other method of initiating the start of the method. If the embodiment uses a regular interval, the interval length could be any length of time, t, ranging from milliseconds to months but may typically be in a range of several minutes to a day with a common length being one to eight hours.

At block 102, resource utilization data for each server may be reported and added to a data set of historical data. The data may be reported to a central agent responsible for maintaining a database of the data for the entire group of servers in some embodiments, while in other embodiments the data may be broadcast from each server so that all the other servers in the group can maintain their own database, and in yet other embodiments each server may be responsible for maintaining a database of its own historical data that may be accessed by the other servers. Other methods of distributing the historical data may be used in other embodiments. The data set of historical data may then be stored in non-transitory computer readable medium for use by an embodiment over time.

The historical data may be organized as average and/or peak usage of the identified resource over time periods. In one embodiment, CPU, memory, disk, and or other resource utilization data may be obtained from an agent-based software system running on the operating system (OS) of each of the servers in the group of servers. Resource data for each server in the group of servers may be retrieved with hourly (or other time period) granularity (e.g., average CPU/disk utilization over 60 minutes interval across all CPUs and disks for each server), and aggregated to find daily, weekly and monthly CPU, memory, disk, and/or other resource utilization for the servers. CPU, memory space, disk resources, or the like of data centers may be modeled as individual non-consumable resources which may be available to the users of the group of servers for allocation.

Embodiments manage the power consumed by a group of servers in a large IT system. The group of servers may be homogenous, providing an equivalent set of resources from each server, or heterogeneous, with different resources provided from the individual servers in the group. The group of servers may be configured to serve a single application, such as running a database or responding to web search inquiries, where various aspects and/or threads of the application are distributed to the various servers in the group, or the group of servers may be configured to server a variety of different applications. Some applications may be limited to a particular subgroup of servers within the group or even to a particular server, while other applications may be assigned to any server in the group. In some cases, aspects of power management of the group of servers may be managed by various embodiments while other aspects may be managed by other methods. For example, servers may manage an availability of their CPUs, memory and/or hard disks according to various embodiments, while a central console may determine which servers are assigned to each group of servers and may configure, or provision, different numbers or types of servers for different periods or manage other aspects of power in the group of servers. One or more servers in a group of servers may manage power using various embodiments while, in some cases, other servers in the group may manage power using other methods.

At block 103, each server may retrieve the most recent set of historical data including data for the most recently completed time period. As described above, different embodiments may utilize different methods to store and retrieve the historical data. Once the historical data for the group of servers has been retrieved, each server may then individually determine what resources to provide in the next time period at block 110 and provision its own resources appropriately. Then at block 199, the server may wait until the next time period. The embodiment described here has each server managing its own resources but other embodiments may manage the resources of another server and in some embodiments, a central computer may manage the power of all the servers in the group. This generalized scenario where each individual provider of resources may have access to the historical demand data and must determine what resources to provide in a future time period based on that historical demand data is sometimes referred to as "The Potluck Problem" referring to the situation of a recurring potluck dinner where each participant must determine how much food to bring to the next potluck dinner based on how much demand there was for food in the past potluck dinners.

The servers may be considered a supplier of the resources while the applications or other tasks that may be assigned to the group of servers may be considered the consumer of those resources. A time instance t, at which the resources offered by the suppliers may be allocated to consumers, may be considered. The quantity of the resource supplied by a server i at instance t may be denoted as $s_{i,t}$ and the quantity demanded by a consumer j at instance t as $d_{j,t}$. Supply and demand of a resource may be considered as balanced if:

$$\sum_j d_{j,t} = \sum_i s_{i,t}$$

Starvation implies a situation where the aggregate supply $$\sum_i s_{i,t}$$

of resources in the data center is less than the aggregate demand $$\sum_j d_{j,t}.$$

This may be interpreted as a situation where there are not enough resources provisioned in the data center at instance t causing the operational efficiency of the consumer agents to be hampered. On the other hand, excess at a particular instance implies that there may be more resources than are actually required at that instance. This may be interpreted as a situation where there are idle resources in the data center which add to the power usage of the data center without being utilized. The remaining discussion focuses on what happens in a single server, so the indices of which server is being discussed (ion j) may be removed from the equations below.

Figure 2:
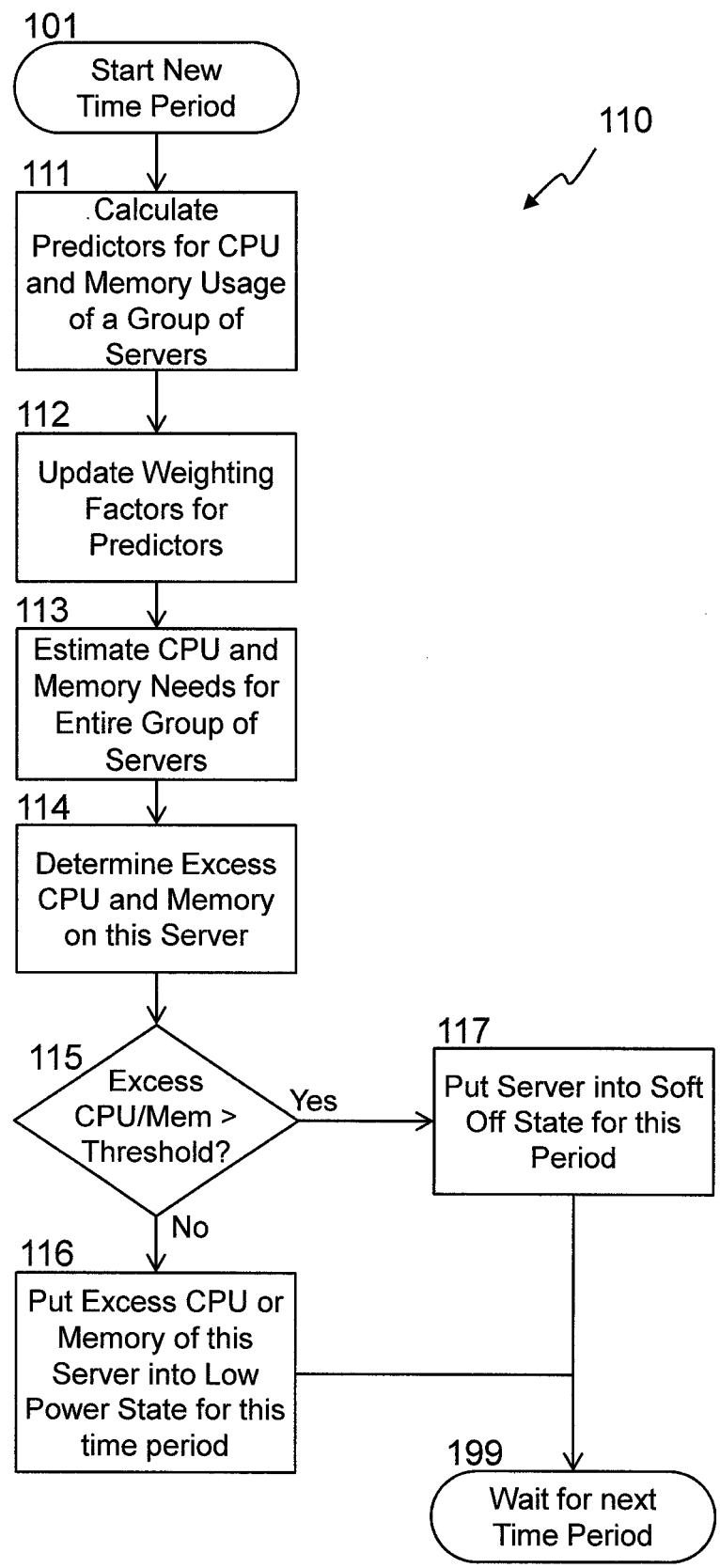
FIG. 2 is a flowchart showing more detail on how an individual server determines what resources to provide during a given time period.

FIG. 2 is a flowchart 110 showing more detail on how an individual server determines what resources to provide in a given time period. At the start of each time period, the method starts at block 101. (Block 101 of FIG. 2 correlates to block 101 of FIG. 1). At block 111, predictors of utilization of each resource being managed by the embodiment may be calculated for a future time t+1. To calculate these predictors, updated historical data for the actual amount of resources used in the group of servers (or the utilization of those resources) including data for the most recent time period t may be obtained. The historical data may be created by an agent-based software system running on the operating system (OS) of each of the servers in the group of servers and storing the data on non-transitory computer readable medium that can be accessed by an embodiment. This updated historical data may then be used to calculate a set of predictors for each resource being managed.

Resources may include CPUs or processing capability, an amount of system memory available to the processor, an amount hard disk space or a number of physical hard disks, or other resources that a server may apply to serving the needs of an application or otherwise result in power consumption. In many cases, the predictors may be calculated using the historical data of resource usage of the group of servers in the past. Given the historical data about utilization of CPU and disk resources for the past t instances, demand for these resources in instance t+1 may be predicted using a variety of algorithms. Some specific predictors of utilization that may be used are:

1. Average hourly/daily/weekly/monthly resource utilization correlated to average utilization of each of the other resources. For instance, CPU usage correlated to memory/disk usage, or the like;
2. Each resource's utilization auto-correlated to itself with varying time lags (in hours/days);
3. nth weekday's resource utilization as related to x % of average resource utilization of pasty weeks' nth weekday, where $0 \leq x \leq 100$ is a tunable parameter;
4. Average hourly/daily/weekly/monthly resource utilization as related to average hourly/daily/weekly/monthly CPU utilization of past n alternate weeks;
5. Other variations of the above, based on different statistical and time parameters;
6. Utilization of outside information such as scheduled events or other activities to predict out-of the ordinary usage patterns; and
7. Other algorithms for predicting resource usage that may or may not be based on historical usage patterns. Adding more predictors, of any kind, can only enhance the overall accuracy, and does not adversely impact the method used.

Each server implementing an embodiment may choose a set of k predictors. The predictors may be selected by the server for its own power consumption, or may be selected by another server designated to implement the embodiment, e.g., a central control server. In some embodiments, the set of predictors may be chosen randomly for each server in the group of servers so that not every server uses the same set of k predictors. In some embodiments, data on how the predictors would have performed in the past may be calculated based on historical utilization data and the results for each predictor compared against the actual utilization data to for accuracy. In some embodiments the servers may have only one set of predictors. The one set of predictors may predict CPU utilization, Memory Usage, Disk Usage, or utilization of some other resource of the servers. In other embodiments, the servers may have two sets of predictors, one set for one resource and another set for a different resource. The two resources may be CPU utilization, Memory Usage, Disk Usage, or utilization of some other resource of the servers. Other embodiments may have even more sets of predictors with one set of predictors for each resource being managed. In some cases, a single predictor may generate resource predictions for multiple resources so a single predictor might be included in multiple sets or predictors.

In many embodiments the set of predictors used in a given server may utilize the same algorithms for each time period. But not every server need have the same set of predictors. In some embodiments, the set of k predictors are chosen randomly on each server from the set of potential predictors for each resource. In other embodiments, the set of predictors may be manually configured. In some embodiments, the set of predictors may change over time on a given server. The predictors each create a calculation of a predicted amount of a resource that may be required of the entire group of servers for the time period being examined. In mathematical nomenclature, the calculated prediction of each predictor p of resource r at time t may be referred as $O_{r,p,t}$.

At block 112 weighting factors may be updated using utilization data of the resources of the group of servers for the most recent time period. The weighting factors may be seen as an indication of the efficacy of the predictor, with predictors that are better at predicting the actual behavior of the resource having a higher weighting factor than those predictors that are not as effective. In some embodiments, the weighting factors are normalized to sum up to one, so that all weighting factors are $0 < W < 1$. Other embodiments, depending on the specifics of the implementation may not normalize the weighting factors and may use any value of weighting factors, including values equal to and/or greater than one and less than or equal to zero. The historical utilization data for the demand in the entire group of servers of a particular resource r at time t may be referred to as $D_{r,t}$. A weighting factor for predictor p of resource r at time t may be referred as $W_{r,p,t}$. Any method of updating the weighting factors may be used that updates the weighting factors so the most accurate predictors have their weighting factors increased and the least accurate predictors have their weighting factors decreased. One algorithm that may be used in some embodiments is to multiply each weighting factor by an adjustment factor of $\beta^v$, so that $W_{r,p,t+1} = W_{r,p,t} \times \beta^v$ where $0 < \beta < 1$ and if $$\frac{O_{r,p,t}}{D_{r,t}} > 1,$$

then v is set to $$\frac{O_{r,p,t}}{D_{r,t}},$$

and if $$\frac{O_{r,p,t}}{D_{r,t}} \leq 1,$$

then v is set to $$\frac{D_{r,t}}{O_{r,p,t}}.$$

Setting the adjustment factor this way means that the adjustment factor will always be between zero and β and the selection of the value of β also adjusts the sensitivity of the adjustment factor with lower values of β causing a faster fall off of the weighting factor of an inaccurate predictor. Another algorithm that may be used is shown in the equation:

$$W_{r,p,t+1} = W_{r,p,t} \times \frac{D_{r,t}}{|D_{r,t} - O_{r,t}| + D_{r,t}}$$

After updating all the weights, they may be normalized to sum to one using the equation:

$$W_{r,p,t+1} = \frac{W_{r,p,t+1}}{\sum_{p=1}^{k} W_{r,p,t+1}}, \, p = 1, 2, \ldots, k$$

An initial set of weighting factors may need to be created in the first pass of an embodiment. Some embodiments may create the initial set of weighting factors equally by dividing one by the number of predictors being used. Other embodiments may create an initial set of weighting factors by picking one time period and then choosing the initial weighting factors by subtracting the percentage error from 100% (but allowing nothing below 0%) and then normalizing the weighting factors to sum up to 1. Other embodiments may start with one of the initial weighting factors discussed above and iterate through the historical data using the same algorithm as may be done in for each future time period, as outlined in the discussion above, to come up with a more accurate initial weighting factor to start the process.

It may be noted that adding a good predictor to the system of predictors in various embodiments improves the final estimations, but that if a bad predictor is added to the system of predictors, it may not bring down the accuracy factor of final estimations significantly because with each iteration, the poor predictor provides inaccurate demand estimates, as a result the weight assigned to this predictor may be decreased over time. After a small number of iterations, the weight of this predictor may be reduced to such an extent that it no longer has an impact on the final estimates provided. The same effect may mean that the initial values assigned to the weighting factors may not matter in the long run due to the effect of updating their values with each pass through an embodiment.

Once the weighting factors have been updated, the resource needs for the group of servers in time period t+1 may be estimated at block 113. The estimate of the resources r needed by the group of servers at time t may be referred to as $P_{r,t}$. Any algorithm using the predictors and weighting factors may be used to estimate the resource requirements, but in many embodiments, this may be done by multiplying the predictors by their associated weighting factors and summing the results as shown in the equation:

$$P_{r,t+1} = \frac{\sum_{p=1}^{k} (W_{r,p,t+1} \times O_{r,p,t+1})}{\sum_{p=1}^{k} W_{i,p,t+1}}$$

In some embodiments, a constant may be added to the final estimate of the resource utilization to cover overhead and provide a safety margin, (10% in some embodiments although the value could vary widely between embodiments) or a constant may be subtracted to provide for more aggressive power management. The final estimate of the resource utilization after the constant is added or subtracted may then be used to determine excess resources that may be put into low power states to reduce power consumption. It may also be noted, that if the weighting factors are normalized to always add up to one, the calculation of the denominator of the equation for the estimate of resource utilization, $P_{r,t+1}$, may be eliminated, as it will always have the value of one.

At block 114, the server may determine how much of its resources to make available during time period t+1 and how much may be considered excess resource where $A_{r,t}$ is the percentage of the server's resource r that will be made available during time t and $E_{r,t}$ is the excess of that resource during that time period as shown on the equation:

$$E_{r,t} = 1 - A_{r,t}$$

This may be done in a variety of different ways in various embodiments. Some embodiments may simply look at the average utilization of the resources and determine to provide at least that level of utilization of its own resources, rounding up due to the granularity that the resources may be allocated. For example if a server has 4 CPUs, and its estimate of the CPU utilization for the group of servers, $P_{CPU,t+1}$, is 12%, the server may allocate one CPU, or 25% of its CPU resources, during time t+1, leaving 75% as excess. In another embodiment, a server may skew its allocation of available resource based on the server's power efficiency. So a server that may be less power efficient than average may set its allocation at 50% of the average utilization estimate, $P_{r,t+1}$, while a server with high power efficiency may set its allocation at 150% of $P_{r,t+1}$. In another embodiment, a server may simply adjust its previous allocation of resources based on how much the estimate for the utilization of a resource changes from the previous time period, so that:

$$A_{r,t+1} = A_{r,t} \times \frac{P_{r,t+1}}{D_{r,t}}, \, 0 \le A_{r,t+1} \le 1$$

Other algorithms may be used that create an allocation of a server's resource (and, therefore, a complimentary excess amount of resource), based on the estimate of the resource required may be used. The data set of historical estimates of excess resources, predictors and weighting factors may then be stored in non-transitory computer readable medium for use by an embodiment over time.

The amount of excess resource for the upcoming time period may be evaluated at block 115. If the amount of excess resource is less than a threshold value, the excess resource may be put into a low power state for the next time period in block 116. If the amount of excess resource is greater than the threshold, the entire server may be put into a soft off state for the next time period. The threshold chosen may be dependent on the efficiency of the server so that a less power efficient server may go to the soft off state with a lower amount of excess resource than a more power efficient server. If multiple resources are being managed, the threshold calculation may use a Boolean OR function where if either resource being managed has an excess amount over a threshold, the server is put into a soft off state while other embodiments may use a Boolean AND function requiring that all resources being managed have an excess that exceeds their threshold before putting the server into a soft off state. The threshold value used by an embodiment may vary widely, depending on the power efficiency of the overall server, the ability of the particular server to effectively power manage the resource by putting only some of that resource into a low power state, the management policies of a particular group of servers and whether it may be preferred to have starvation or excess of resource. Some embodiments may utilize multiple thresholds for the same resource, using a Boolean function (OR, AND, XOR, or the like) on the multiple threshold to determine whether or not to put the server into a soft off state. For one embodiment, a threshold may be ((((<8% average CPU utilization) AND (<21% disk utilization)) OR ((<14% peak CPU utilization) AND (<15% disk utilization))).

At block 116, excess resources may be put into a low power state while the server continues to operate during the next time period. Methods used to put resources into a low power state are well known in the art and may utilize both hardware and software components to accomplish the task. Hardware methods to put CPUs into a low power state may include such techniques as disconnecting power, lowering voltages, stopping clocks, lowering clock frequencies, and other techniques as might be supported in a specific design. Hardware methods of putting portions of memory into a low power state may include disconnecting power, lowering voltages, stopping clocks, enabling automatic refresh, or other techniques as might be supported in a specific design. Hardware techniques for putting hard disks into a low power state include disconnecting power, stopping disk rotation, or other techniques as might be supported in a specific design. Software components used in putting resources into a low power state may include executing specific instructions in a CPU to halt processing in that CPU, setting specific registers in a hard disk to enable low power states, using techniques defined by the Advanced Configuration and Power Interface (ACPI) specification, using techniques defined by the PCI Power Management specification, or using other software power management techniques and/or algorithms.

At block 117, the server may be put into a soft off state. A soft off state may be characterized by a significant reduction in the power consumed by the server compared to its full operating power and having most of the resources of the server become unavailable to applications that may be assigned to any group of servers that the server may be a part of. The server may be in a very low power state with power cut off from many subsystems entirely. It may not necessarily mean, however, that there is no activity going on in the server or that the power to the server has been removed entirely, although, in some embodiments, the server could be completely shut down with no power until the next time period. The server may periodically reevaluate its situation and may still be running portions of a computer program implementing an embodiment. For example, the server may be mostly powered off including removing power from the CPUs, hard disks, memory and network adapter, but a timer may still be operating so that after each period of time (which may range from milliseconds to days), the server may be turned back on and the computer program continued by the CPU to determine whether the server should remain on or should be put back into a soft off state. In other embodiments, the soft off state may retain data in the memory in a low power state to minimize the time it takes for the server to return to the operating condition when it comes out of the soft off state. In yet other embodiments, the CPU may retain context in a low power state in soft off. Common names in use in the industry for a soft off state as defined herein include "S5," "S4," "hibernate," "S3," "suspend," and "stand-by," but soft off should not be limited to the common meanings of those names.

Once the server has configured itself for the next time period, it may wait for the next time period before re-evaluating its power management configuration. If some or all of its resources are still available for use, the server may continue to serve applications assigned to it.

Figure 3:
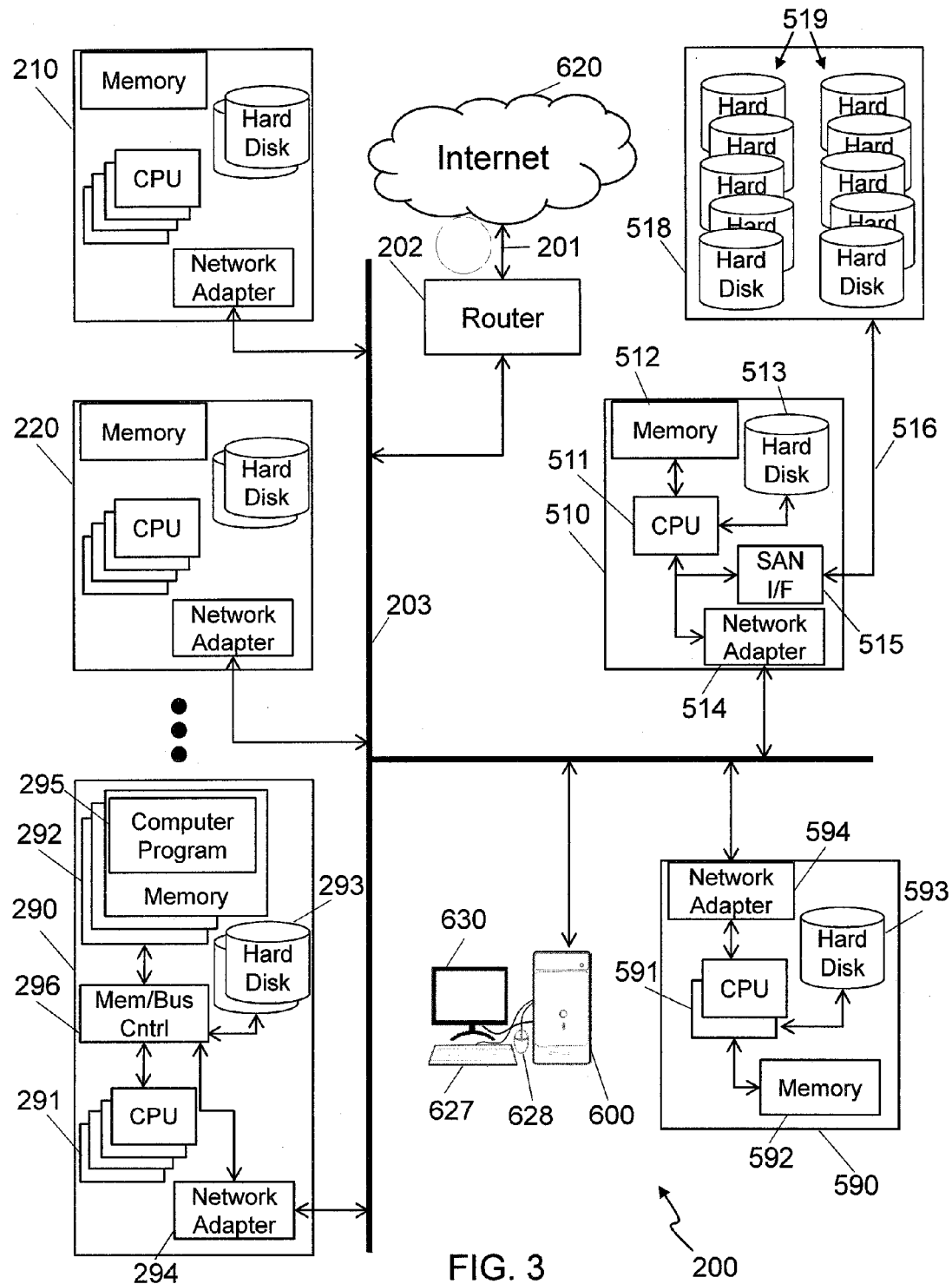
FIG. 3 shows a block diagram of a large IT system configured to implement various embodiments.

FIG. 3 shows a block diagram of an embodiment of a large information technology (IT) system 200, as might be found in a data center or server farm, which might have its power managed using various embodiments. One skilled in the art may recognize that many different architectures of a large IT system 200 may be suitable for the various embodiments. The large IT system 200 may have one or more computer servers 210, 220, 290, 510, 590 or workstations 600 suitable for implementing various embodiments. In some embodiments, the number of servers may range into the thousands or more. The large IT system 200 may be connected to the interne 620 through a router 202, or network of routers and switches, by a high speed connection 201 or multiple high speed connections High speed connections that might be used for a large IT system 200 include, but are not limited to 1.544 Mbit/sec T1 (DS-1, Digital Signal 1) or 44.736 Mbit/sec T3 (DS-3, Digital Signal 3) connections, various speed Synchronous Optical Networking (SONET) or Synchronous Digital Hierarchy (SDH) optical connections (sometimes referred to as OC-X where X is a multiplier of the base bandwidth) which typically provide connections in multiples of 51.840 Mbit/sec, or other types of connections to the internet infrastructure.

The large IT system 200 may include a number of servers 210, 220, 290, 510, 590 and other computer systems 600 interconnected by a network 203, multiple networks, switching fabric interconnect, or other types of connections. The network 203, multiple networks, and/or switching fabrics might utilize wired networks, wireless networks and/or optical networks. The network 203 may also utilize additional routers, switches, crosspoint switches, switching fabrics or other networking equipment to connect the various multiple networks and/or communication links. Various installations may have a homogeneous or a heterogeneous networking environment. Wired communication links that might be used by a large IT system 200 may include various speed ethernet networks (ranging from 10 Mbit/s up to 100 Gbit/s with higher speeds under development), infiniband, serial advanced technology attachment (SATA), small computer systems interface (SCSI), the twisted pair version of fibre channel and other standard and/or proprietary wired communication protocols. Wireless communication links that might be used by a large IT system 200 may include various versions of 802.11 (Wi-Fi), 802.16 metropolitan area networks (including WiMax) and other standard and/or proprietary radio frequency communication protocols. Optical communication links that might be used by a large IT system 200 may include fiber distributed digital interface (FDDI), Fibre Channel, SONET and other standard and/or proprietary optical communication protocols.

Multiple devices may connect to the network 203. One device that may be connected is a computer workstation 600 with monitor 630, keyboard 627 and mouse 628, or other computing device. The computer workstation 600 may be used to run certain applications for managing and/or controlling the servers 210, 220, 290, 510, 590 of the large IT system 200. A variety of other device may also be connected to the network 203 including, but not limited to servers 210, 220, 290, 510, 590. Some embodiments may utilize a homogenous set of servers 210, 220, 290 where each server may provide the same set of capabilities and resources. Other embodiments may include heterogeneous servers 510, 590 providing different sets of capabilities and resources. A wide variety of different configurations of servers or other computing platforms may be utilized by various embodiments.

Server 590 may be an older model server with a smaller set of resources. It may have a network adapter 594 for connecting to the network 203 and two CPUs 591. The CPUs 591 may be able to communicate with the memory 592 and hard disk 593. The server 590 may have the ability to put one of its CPUs into a low power state without impacting the other CPU. The server 590 may also be able to put portions of the memory 592 and/or hard disk 593 into a low power state without impacting the other portions of memory 592 and/or hard disk 593. The server 590 may require a higher level of power to deliver a given amount of application performance because of being an older model. It might, therefore, use a lower threshold value of excess resources in determining whether or not to put itself into a soft off state for a given period of time, than a server that can deliver an equivalent level of performance with a lower expenditure of power.

Server 510 may be configured to primarily deliver hard disk resources for applications running on the large IT system 200. It may have one or more CPUs 511 in communication with memory 512 and a network adapter 514 allowing it to connect to the network 203. The server 510 may also have local disk storage 513 that may be used by the operating system and local applications. The server 510 may also have a storage area network (SAN) interface 515 allowing it to connect to a group of hard disks 519. The SAN 516 could use Fibre Channel, iSCSI, HyperSCSI, SATA, Serial Attached SCSI (SAS), Enterprise Systems Connection (ESCON) or other protocols to communicate with the group of hard disks 519. The group of hard disks 519 may be integrated into a common chassis with the server 510 or it may be housed in its own chassis 518 with its own power supplies or other configurations. The group of disks 519 may be organized in a JBOD (Just a Bunch of Disks) or RAID (Redundant Array of Inexpensive Disks) configuration. The server 510 may be able to control the power of each disk individually, or in subgroups, to be able to put some of the disks that may not be required into a low power state for different periods of time to save power. In some cases, the server 510 may need to migrate data from a first hard disk to a second hard disk of the group of disks 519 so that the first hard disk can be put into a low power state but the data can still be accessed.

The large IT system 200 may have a group of similar servers 210, 220, 290 that may provide a similar set of resources. They may have somewhat different configurations of number of CPUs, speed of CPUs, amount of memory, number and size of hard disks, or the like but in general, they may provide similar resources. While the term "group of servers" may be used to refer to the similar servers 210, 220, 290, it may also refer to groups that may include dis-similar servers such as the older server 590, the disk server 510 and/or even the workstation 600; the term should be taken to mean any group of computer resources unless it is more specifically narrowed by the context of the use. Server 290 may serve as a typical representation of the servers within the group of servers 210, 220, 290 for discussing the details of the servers.

The server 290 may include one or more CPUs 291 which may be embodied as microprocessors, one or more multi-core processors, a central processing unit (CPU) or other such control logic or circuitry. The CPU 291 may be configured to access a local cache memory, and send requests for data that are not found in the local cache memory across a cache bus to a second level cache memory. Some embodiments may integrate the CPU 291, and the local cache onto a single integrated circuit and other embodiments may utilize a single level cache memory or no cache memory at all. Other embodiments may integrate multiple CPUs 291 onto a single die and/or into a single package. Yet other embodiments may integrate multiple CPUs 291 with multiple local cache memories and a second level cache memory into a single package with a front side bus to communicate to a memory/bus controller 296. The memory/bus controller 296 may accept accesses from the CPUs 291 and direct them to either the internal memory 292 or to various input/output (I/O) busses. Some embodiments of the server 290 may include multiple processor packages sharing the front-side bus to the memory/bus controller 296. Other embodiments may have multiple processor packages with independent front-side bus connections to the memory/bus controller 296. The memory/bus controller 296 may communicate with the internal memory 292 using a memory bus. The internal memory 292 may include one or more of random access memory (RAM) devices such as synchronous dynamic random access memories (SDRAM), double data rate (DDR) memories, or other volatile random access memories. The internal memory 292 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. In some embodiments, the server 290 may also include $3^{rd}$ level cache memory or a combination of these or other like types of circuitry configured to store information in a retrievable format. Memory devices as described above are examples of machine readable (also called computer readable) mediums suitable for storing the final or interim results of the various embodiments. In some implementations the internal memory 292 may be configured as part of the CPU 291, or alternatively, may be configured separate from it but within the same package. The CPU 291 may be able to access internal memory 292 via a different bus or control lines than is used to access the other components of the server 290.

The server 290 may also include, or have access to, one or more hard disks 293 (or other types of storage memory) and optical disk drives. Hard disks 293 and the optical disks for optical disk drives are examples of machine readable (also called computer readable) mediums suitable for storing the final or interim results of the various embodiments. The optical disk drives may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of server 290 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable storage medium. The server 290 may either include the hard disks 293 and optical disk drives as an integral part of the server 290 (e.g., within the same cabinet or enclosure and/or using the same power supply), as connected peripherals, or may access the hard disks 293 and optical disk drives over a network, or a combination of these. The hard disk 293 often includes a rotating magnetic medium configured for the storage and retrieval of data, computer programs or other information. In some embodiments, the hard disk 293 may be a solid state drive using semiconductor memories. In other embodiments, some other type of computer useable medium may be used. The hard disk 293 need not necessarily be contained within the server 290. For example, in some embodiments the hard disk 293 may be server storage space within a network that is accessible to the server 290 for the storage and retrieval of data, computer programs or other information similar to server 510. In some instances the server 290 may use storage space at a server storage farm, or like type of storage facility, that is accessible by the Internet 620 or other communications lines. The hard disk 293 may be used to store the software, instructions and programs executed by the server 290, including for example, all or parts of the computer application program for carrying out activities of the various embodiments.

Communication links may be used to access the contents of the hard disks 293 and optical disk drives. The communication links may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium. The memory/bus controller 296 may also provide other I/O communication links. In some embodiments, the links may be a shared bus architecture such as peripheral component interface (PCI), microchannel, industry standard architecture (ISA) bus, extended industry standard architecture (EISA) bus, VERSAmodule Eurocard (VME) bus, or any other shared computer bus. In other embodiments, the links may be a point-to-point link such as PCI-Express, HyperTransport, or any other point-to-point I/O link. Various I/O devices may be configured as a part of the server 290. In many embodiments, a network interface 294 may be included to allow the server 290 to connect to the network 203.

A computer program 295 may implement an embodiment and may be stored in a non-transitory computer readable medium of the server 290 such as the memory 292 or hard disk 293. The computer program 295 may be accessed by the CPUs 291 and the instruction of the computer program 295 may be executed by the CPUs 291 to perform an embodiment. Various parts of the computer program 295 may configure the server 290 to put one or more of the CPUs 291 or portions of CPUs 291 into a low power state for different periods of time to save power. Various parts of the computer program 295 may configure the server 290 to put one or more hard disks 293 into a lower power state for different periods of time to save power. Various parts of the computer program 295 may configure the server 290 to put sections, portions, blocks or banks of memory 292 into a low power state for different periods of time to save power. The server 290 may be designed to allow particular resources, or portions of resources, such as CPUs 291, hard disks 293 and/or memory 292 to be put into a low power state with little or no impact on the performance of the server 290 that is still operating. Such techniques are well known in the art and are not discussed here. The computer program 295 may also put the entire server 290 into a soft off state.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuit," "module," "logic" or "system." Furthermore, aspects of the various embodiments may take the form of a computer program product embodied in one or more computer readable medium(s) having computer readable program code stored thereon.

Any combination of one or more computer readable medium(s) may be utilized. The non-transitory computer readable medium is typically a computer readable storage medium. A computer readable storage medium may be embodied as, for example, an electronic, magnetic, optical, electromagnetic, infrared, or semiconductor system, apparatus, or device, or other like storage devices known to those of ordinary skill in the art, or any suitable combination of the foregoing. Examples of such computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Various steps, calculation, and data gathering is described above in terms of being performed hourly/daily/weekly/monthly. In practice these activities may take place over any other suitable time period, as would be known by those of ordinary skill in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "obtaining", as used herein and in the claims, may mean either retrieving from a computer readable storage medium, receiving from another computer program, receiving from a user, calculating based on other input, or any other means of obtaining a datum or set of data. The term "plurality", as used herein and in the claims, means two or more of a named element; it should not, however, be interpreted to necessarily refer to every instance of the named element in the entire device. Particularly, if there is a reference to "each" element of a "plurality" of elements, there may be additional elements in the entire device that may not be included in the "plurality" and are not, therefore, referred to by "each."

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

What is claimed is:

1. A computer implemented method for managing power of a first server of a group of servers, the method comprising:
   calculating a first plurality of predictors of utilization of a first resource of said group of servers for a time period;
   updating a first plurality of weighting factors for said first plurality of predictors, said first plurality of weighting factors based on past accuracy of said first plurality of predictors;
   producing an estimation of a total amount of said first resource of said group of servers that will be required for said time period based on said first plurality of predictors and said first plurality of weighting factors;
   determining an excess amount of said first resource available from said first server during said time period based on said estimation of said total amount of said first resource of said group of servers; and
   configuring the excess amount of said first resource of said first server to enter a low power state for said time period.

2. The method of claim 1, wherein said first resource is processing capability.

3. The method of claim 1, further comprising:
   configuring said first server to enter a soft off state for said time period if said excess amount of said first resource available from said first server of said group of servers during said time period exceeds a threshold.

4. The method of claim 1, wherein said first server performs
   the producing of said estimation and
   the determining of said excess amount.

5. The method of claim 1, further comprising:
   obtaining utilization data of said first resource for a plurality of past time periods;
   wherein the calculating of said first plurality of predictors of utilization of said first resource for said time period includes calculating at least one predictor of said first plurality of predictors based on said utilization data of said first resource for said plurality of past time periods.

6. The method of claim 5, further comprising
   generating said past accuracy of said first plurality of predictors by comparing outputs of each predictor of said first plurality of predictors for said plurality of past time periods to said utilization data of said first resource for said plurality of past time periods.

7. The method of claim 1, further comprising:
   calculating a second plurality of predictors of utilization of a second resource for said time period;
   updating a second plurality of weighting factors for said second plurality of predictors, the second plurality of weighting factors based on past accuracy of said second plurality of predictors;
   producing an estimation of a total amount of said second resource of said group of servers that will be required for said time period based on said second plurality of predictors and said second plurality of weighting factors; and
   determining an excess amount of said second resource to provide from said first during said time period based on said estimation of said total amount of said second resource of said group of servers; and
   configuring the excess amount of said second resource of said first server to enter a power saving state for said time period.

8. The method of claim 7, further comprising:
   obtaining utilization data of said second resource for a plurality of past time periods; and
   generating said past accuracy of said second plurality of predictors by comparing outputs of each predictor of said second plurality of predictors for said plurality of past time periods to said utilization data of said second resource for said plurality of past time periods;
   wherein the calculating of said second plurality of predictors of utilization of said second resource for said time period includes calculating at least one predictor of said second plurality of predictors based on said utilization data of said second resource for said plurality of past time periods.

9. The method of claim 8, wherein the calculating of said first plurality of predictors of utilization of said first resource for said time period includes calculating at least one predictor of said first plurality of predictors based on said utilization data of said second resource for said plurality of past time periods.

10. A computer program product for managing power of a server that is one of a group of servers, the computer program product comprising:
a non-transitory computer readable storage medium having computer readable program code embodied therewith, the computer readable program code comprising:
computer readable program code configured to obtain utilization data of a first resource for the group of servers for a plurality of past time periods, wherein the utilization data of the first resource for the plurality of past time periods includes a utilization amount of the first resource for a previous time period, the previous time period being one of the plurality of past time periods;
computer readable program code configured to obtain a previous first prediction of utilization of the first resource for the previous time period and a previous first weighting factor, wherein the first prediction of utilization of the first resource for the previous time period was calculated using a first algorithm;
computer readable program code configured to obtain a previous second prediction of utilization of the first resource for the previous time period and a previous second weighting factor, wherein the second prediction of utilization of the first resource for the previous time period was calculated using a second algorithm;
computer readable program code configured to calculate a new first prediction of utilization of the first resource for a time period using the first algorithm, and a new second prediction of utilization of the first resource for the time period using the second algorithm;
computer readable program code configured to create a new first weighting factor by adjusting the previous first weighting factor based on how closely the previous first prediction of utilization of the first resource for the previous time period predicted the utilization amount of the first resource for the previous time period;
computer readable program code configured to create a new second weighting factor adjusting the previous second weighting factor based on how closely the previous second prediction of utilization of the first resource for the previous time period predicted the utilization amount of the first resource for the previous time period;
computer readable program code configured to produce an estimation of utilization of the first resource for the time period based on the new first prediction of utilization of the first resource for the time period, the new first weighting factor, the new second prediction of utilization of the first resource for the time period, and the new second weighting factor;
computer readable program code configured to determine an excess amount of the first resource available in the server during the time period based on the estimation of utilization of the first resource for the time period;
computer readable program code configured to cause the excess amount of the first resource in the server to enter a low power state during the time period.

11. The computer program product of claim 10, the computer readable program code further comprising:
computer readable program code configured to configure the server to enter a soft off state for the time period if the excess amount of the first resource available from the server during the time period exceeds a threshold.

12. The computer program product of claim 10, wherein the first algorithm utilizes the utilization data of first resource for the plurality of past time periods.

13. The computer program product of claim 10, the computer readable program code further comprising:
computer readable program code configured to obtain utilization data of a second resource for the group of servers for the plurality of past time periods, wherein the utilization data of the second resource for the plurality of past time periods includes a utilization amount of the second resource for the previous time period;
computer readable program code configured to obtain a previous first prediction of utilization of the second resource for the previous time period and a previous third weighting factor, wherein the first prediction of utilization of the second resource for the previous time period was calculated using a third algorithm;
computer readable program code configured to obtain a previous second prediction of utilization of the second resource for the previous time period and a previous fourth weighting factor, wherein the second prediction of utilization of the second resource for the previous time period was calculated using a fourth algorithm;
computer readable program code configured to calculate a new first prediction of utilization of the second resource for the time period using the third algorithm, and a new second prediction of utilization of the second resource for the time period using the fourth algorithm;
computer readable program code configured to create a new third weighting factor by adjusting the previous third weighting factor based on how closely the previous first prediction of utilization of the second resource for the previous time period predicted the utilization amount of the second resource for the previous time period;
computer readable program code configured to create a new fourth weighting factor adjusting the previous fourth weighting factor based on how closely the previous second prediction of utilization of the second resource for the previous time period predicted the utilization amount of the second resource for the previous time period;
computer readable program code configured to produce an estimation of utilization of the second resource for the time period based on the new first prediction of utilization of the second resource for the time period, the new third weighting factor, the new second prediction of utilization of the second resource for the time period, and the new fourth weighting factor;
computer readable program code configured to determine an excess amount of the second resource available in the server during the time period based on the estimation of utilization of the second resource for the time period;
computer readable program code configured to cause the excess amount of the second resource in the server to enter a power saving state during the time period.

14. The computer program product of claim 13, wherein the first algorithm utilizes the utilization data of second resource for the plurality of past time periods.

15. The computer program product of claim 13, wherein the first resource is processing capability and the second resource is memory capacity.

16. A computer server, having an available amount of a first resource, the server comprising:
at least one processor;

a network adapter communicatively coupled to the at least one processor, the network adapter configured to communicate with other servers over a network;

a non-transitory computer readable storage medium communicatively coupled with the at least one processor, the non-transitory computer readable storage medium having computer readable program code embodied therewith, the computer readable program code comprising:

computer readable program code configured to calculate a first plurality of predictors of utilization of the first resource of a group of servers for a time period, the group of servers comprising the server and the other servers;

computer readable program code configured to update a first plurality of weighting factors for the first plurality of predictors, the first plurality of weighting factors based on past accuracy of the first plurality of predictors;

computer readable program code configured to produce an estimation of a total amount of the first resource of the group of servers that will be required for the time period based on the first plurality of predictors and the first plurality of weighting factors; and computer readable program code configured to determine an excess amount of the first resource available from the server during the time period based on the estimation of the total amount of the first resource of the group of servers; and computer readable program code configured to cause the excess amount of the first resource of the server to enter a low power state for the time period.

17. The server of claim 16, wherein the first resource is processing capability of the at least one processor.

18. The server of claim 16, the computer readable program code further comprising:

computer readable program code configured to set the server to a soft off state for the time period if the excess amount of the first resource available from the server during the time period exceeds a threshold.

19. The server of claim 16, the computer readable program code further comprising:

computer readable program code configured to obtain utilization data of the first resource for a plurality of past time periods, wherein the computer readable program code configured to calculate of the first plurality of predictors of utilization of the first resource of the group of servers for the time period includes computer readable program code configured to calculate at least one predictor of the first plurality of predictors based on the utilization data of the first resource for the plurality of past time periods; and computer readable program code configured to generate the past accuracy of the first plurality of predictors by comparing outputs of each predictor of the first plurality of predictors for the plurality of past time periods to the utilization data of the first resource for the plurality of past time periods.

20. The server of claim 16, the computer readable program code further comprising:

computer readable program code configured to calculate a second plurality of predictors of utilization of a second resource for the time period;

computer readable program code configured to update a second plurality of weighting factors for the second plurality of predictors, the second plurality of weighting factors based on past accuracy of the second plurality of predictors;

computer readable program code configured to produce an estimation of a total amount of the second resource of the group of servers that will be required for the time period based on the second plurality of predictors and the second plurality of weighting factors; and computer readable program code configured to determine an excess amount of the second resource to provide from the first during the time period based on the estimation of the total amount of the second resource of the group of servers; and computer readable program code configured to cause the excess amount of the second resource of the server to enter a power saving state for the time period.

21. The server of claim 20, the computer readable program code further comprising:

computer readable program code configured to obtain utilization data of the second resource for a plurality of past time periods, wherein computer readable program code configured to calculate the second plurality of predictors of utilization of the second resource for the time period includes computer readable program code configured to calculate at least one predictor of the second plurality of predictors based on the utilization data of the second resource for the plurality of past time periods; and computer readable program code configured to generate the past accuracy of the second plurality of predictors by comparing outputs of each predictor of the second plurality of predictors for the plurality of past time periods to the utilization data of the second resource for the plurality of past time periods.

22. The server of claim 21, wherein the computer readable program code configured to calculate the first plurality of predictors of utilization of the first resource for the time period includes computer readable program code configured to calculate at least one predictor of the first plurality of predictors based on the utilization data of the second resource for the plurality of past time periods.

* * * * *